No. 803,060. PATENTED OCT. 31, 1905.
G. HUTCHINSON.
MILKING MACHINE.
APPLICATION FILED APR. 3, 1905.
7 SHEETS—SHEET 1.
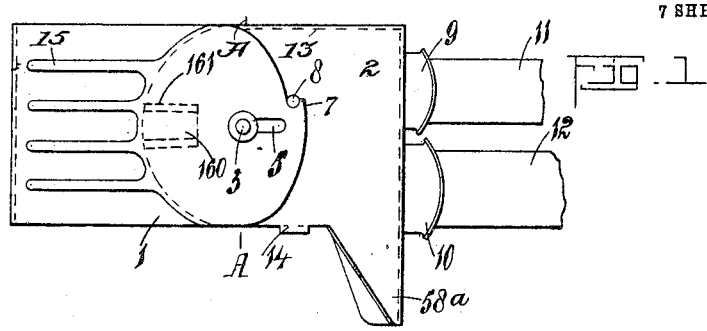
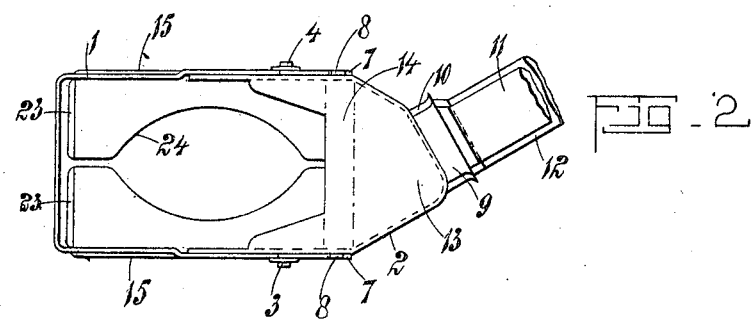
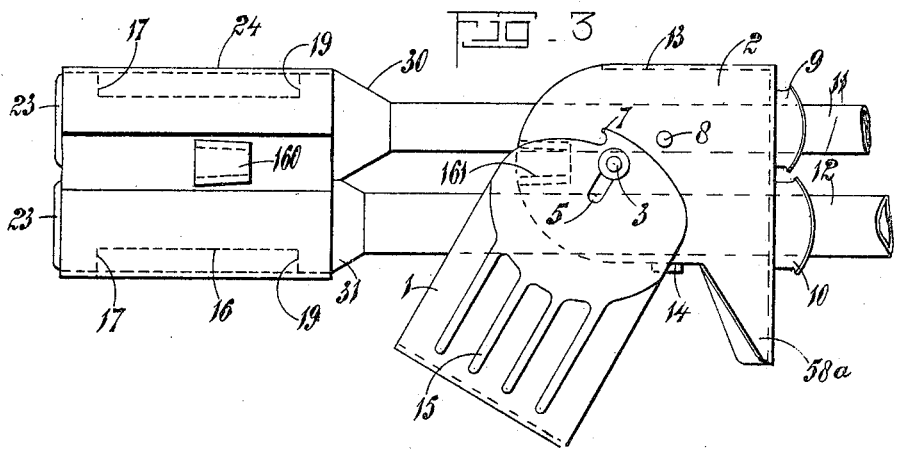
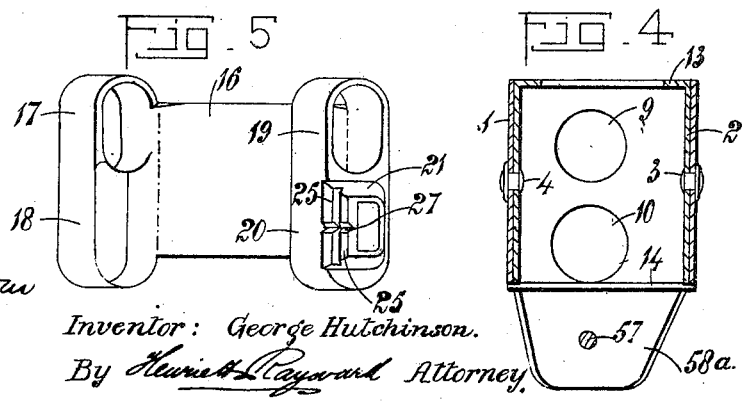
Witnesses:—
E. S. Baldwin
G. A. Ellis
Inventor: George Hutchinson.
By Hewlett Rayward Attorney.

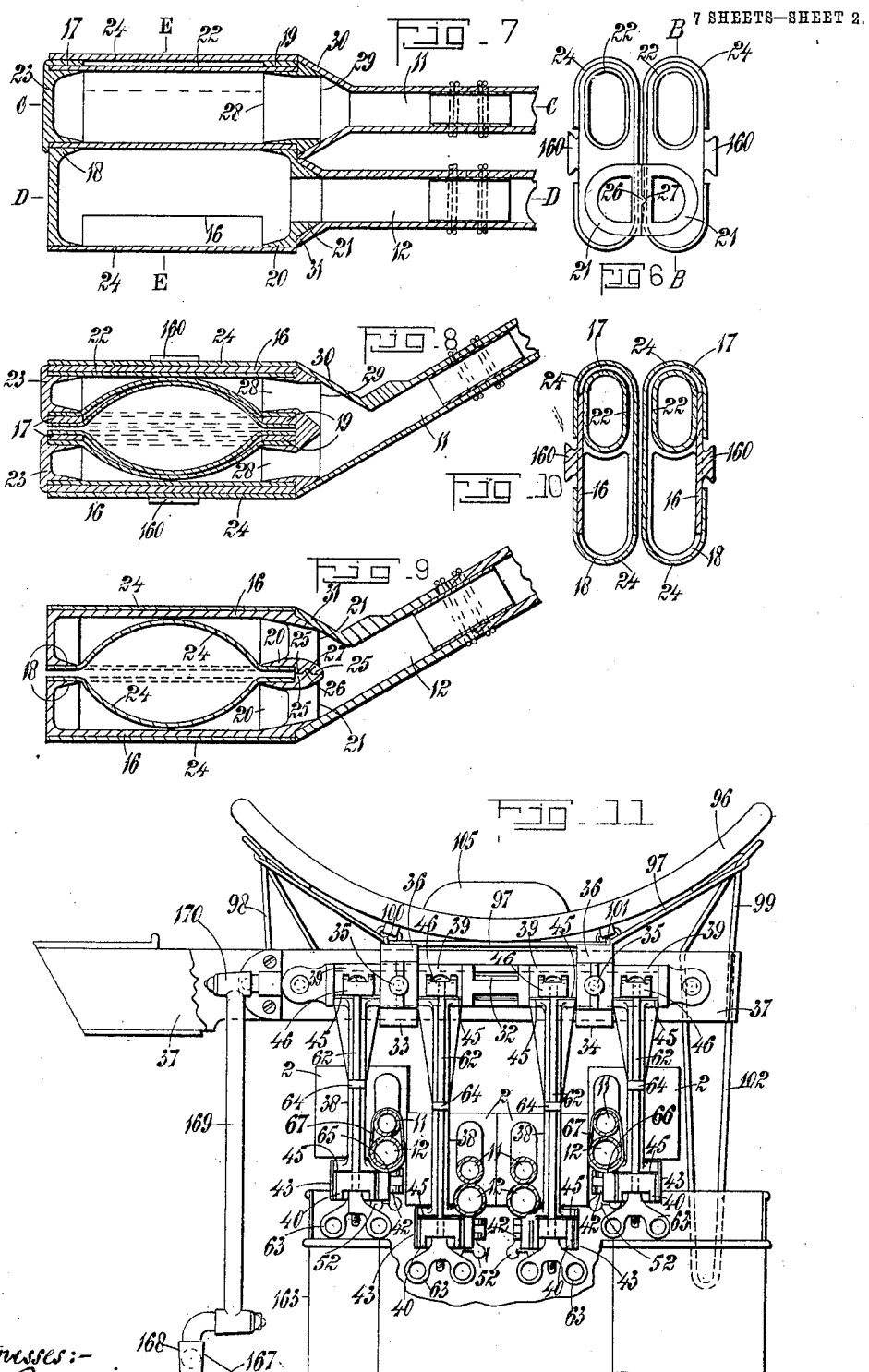

No. 803,060. PATENTED OCT. 31, 1905.
G. HUTCHINSON.
MILKING MACHINE.
APPLICATION FILED APR. 3, 1905.
7 SHEETS—SHEET 3.
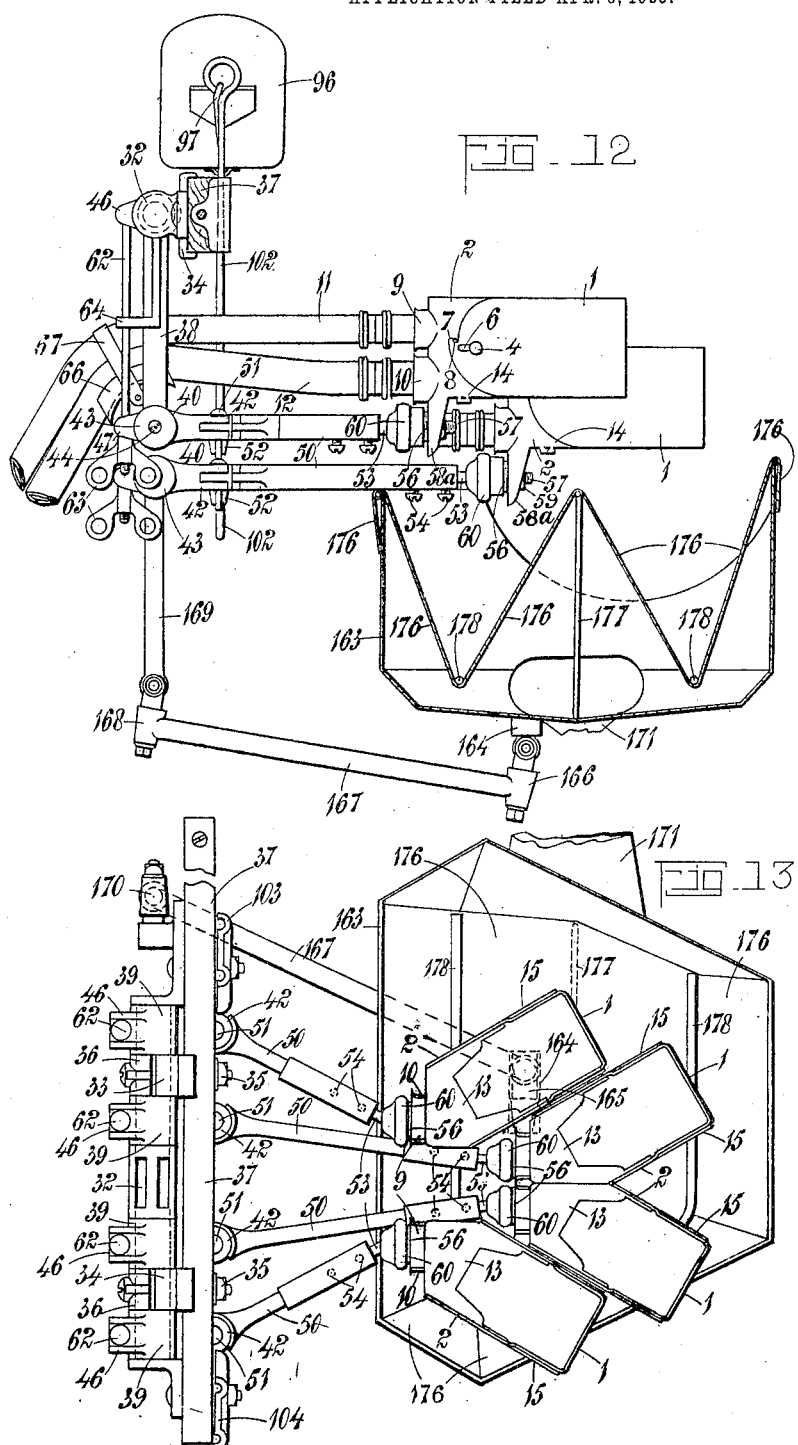
Witnesses:
E. S. Baldwin
G. A. Ellis
Inventor: George Hutchinson.
By Henrie H. Hayward Attorney No. 803,060. PATENTED OCT. 31, 1905.
G. HUTCHINSON.
MILKING MACHINE.
APPLICATION FILED APR. 3, 1905.
7 SHEETS—SHEET 4.
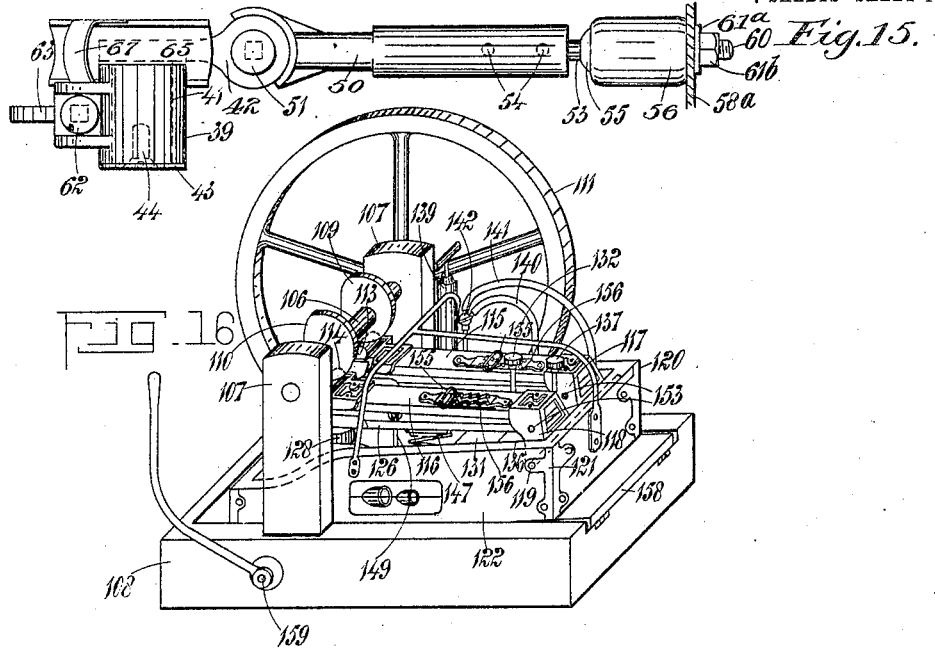
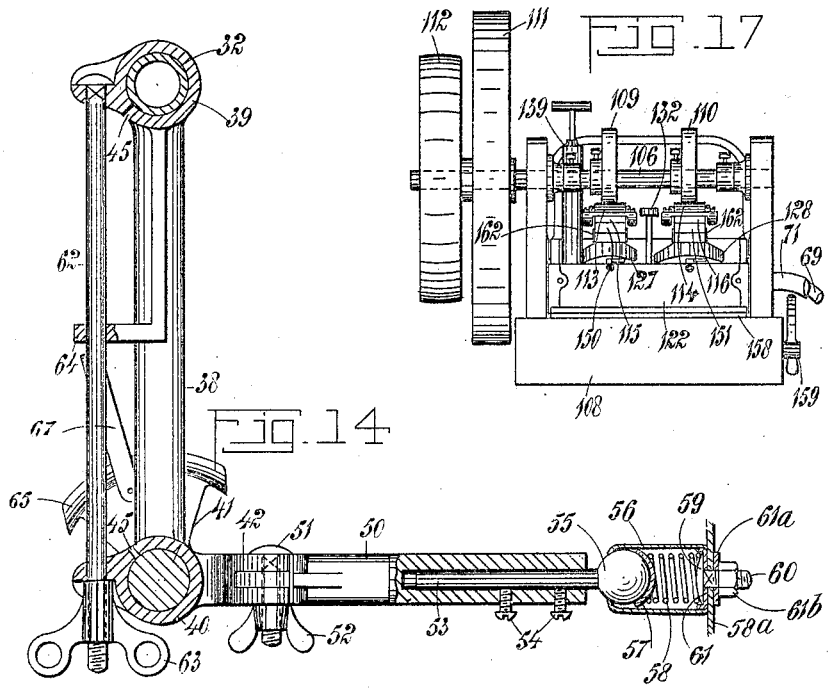
Witnesses:-
E. Baldwin
G. A. Ellis
Inventor: George Hutchinson.
By Harriet Hayward Attorney.

No. 803,060. PATENTED OCT. 31, 1905.
G. HUTCHINSON.
MILKING MACHINE.
APPLICATION FILED APR. 3, 1905.
7 SHEETS—SHEET 5.
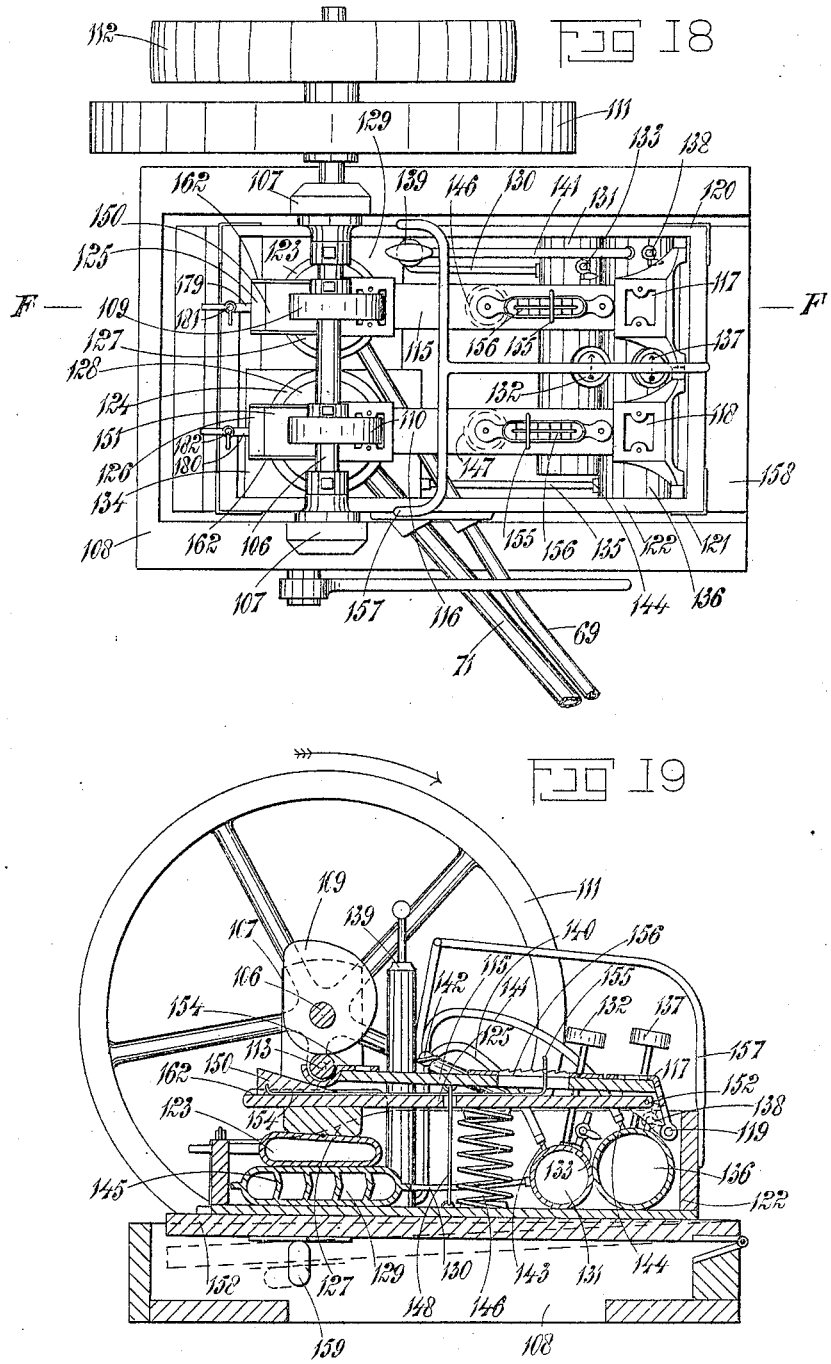
Witnesses:-
E S Baldwin
G A Ellis
Inventor:- George Hutchinson.
By Hewitt Raynard Attorney.

No. 803,060. PATENTED OCT. 31, 1905.
G. HUTCHINSON.
MILKING MACHINE.
APPLICATION FILED APR. 3, 1905.
7 SHEETS—SHEET 6.
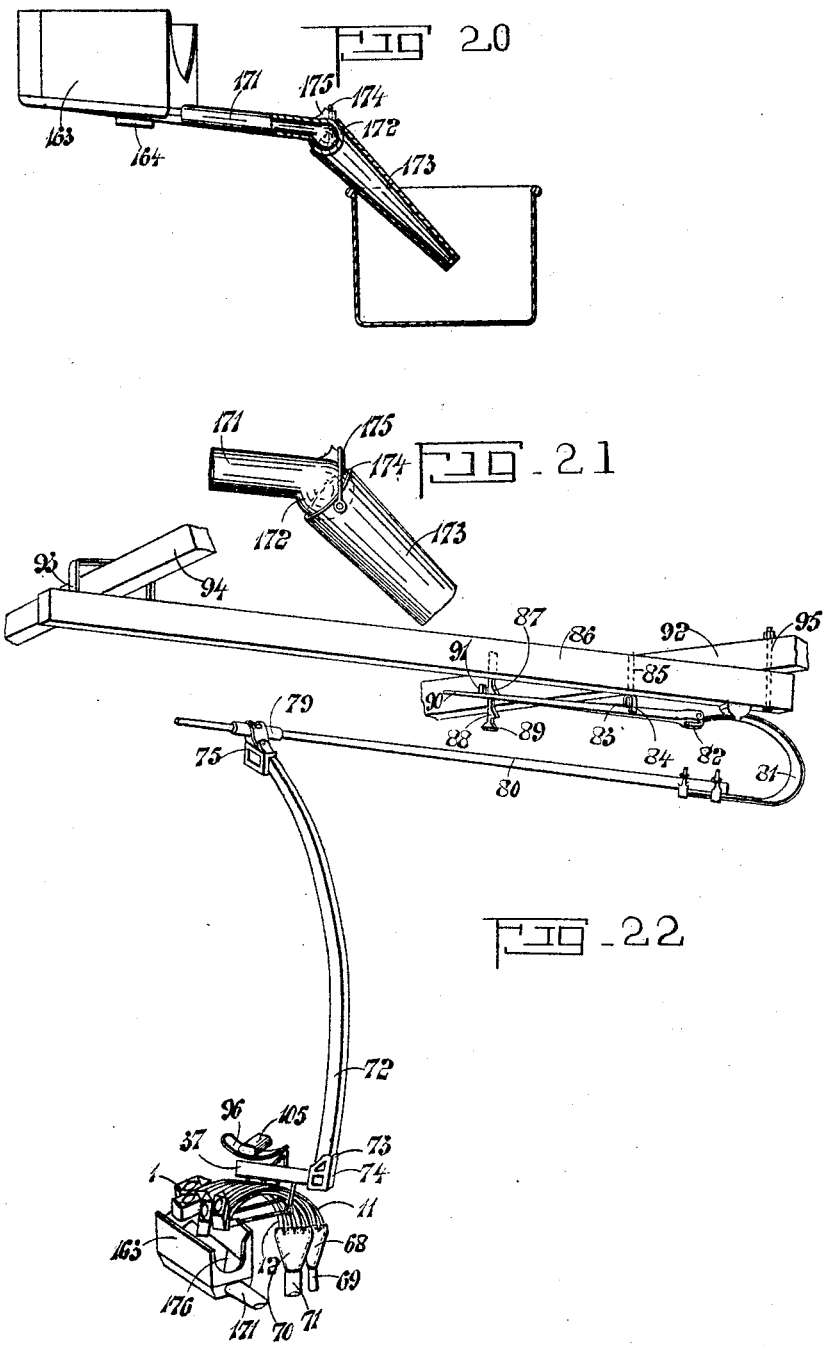
Witnesses.
G. A. Ellis.
E. S. Baldwin.
Inventor
George Hutchinson
by his Attorney
Henrie H. Hayward.

No. 803,060.
PATENTED OCT. 31, 1905.
G. HUTCHINSON.
MILKING MACHINE.
APPLICATION FILED APR. 3, 1905.
7 SHEETS—SHEET 7.
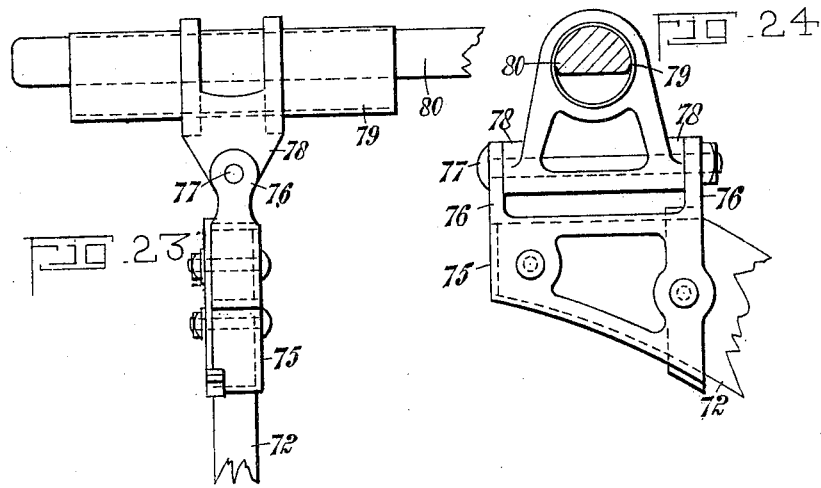
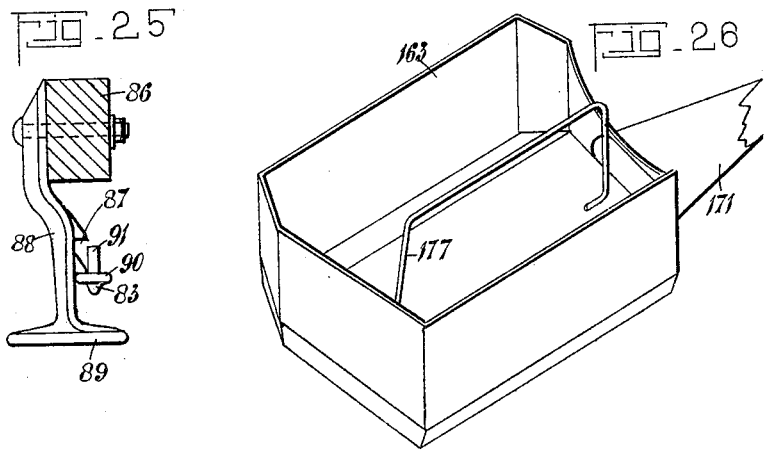
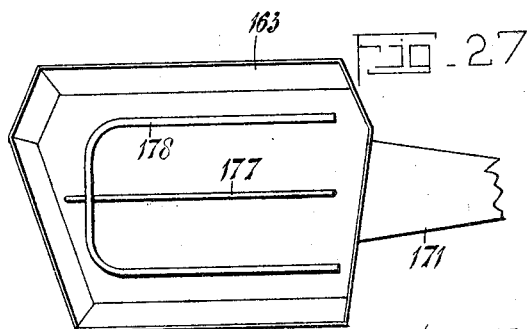
Witnesses:
E. S. Baldwin
Y. A. Ellis
Inventor: George Hutchinson.
By Henrietta Rayward, Attorney.

UNITED STATES PATENT OFFICE.

GEORGE HUTCHINSON, OF SEATOUN, WELLINGTON, NEW ZEALAND.

MILKING-MACHINE.

No. 803,060. Specification of Letters Patent. Patented Oct. 31, 1905.

Application filed April 3, 1905. Serial No. 253,645.

*To all whom it may concern:*

Be it known that I, GEORGE HUTCHINSON, a subject of His Majesty the King of Great Britain and Ireland, residing at Seatoun, Wellington, in the Provincial District of Wellington, in the Colony of New Zealand, have invented certain new and useful Improvements in Milking Machinery, of which the following is a specification.

This invention relates to the milking-machine described in the specification accompanying my application for Letters Patent No. 184,216, dated the 7th day of December, 1903.

The present invention provides improvements in the said machine consisting of the novel parts and the construction, arrangement, and combination of the same hereinafter fully described and illustrated, and as set forth in the claims.

My improvements are in connection with—

First. The teat-presses. These still have the collapsible pouches surrounded by an inflexible outer wall, as described in my said previous specification, but the outer wall of the press is now in two parts, one part being hinged upon the other, whereby it may be turned downwardly to facilitate the placing of the teat between the pouches and to permit of the pouches being drawn out of the outer wall for cleaning purposes.

The pouches of my teat-presses are now constructed in the following manner: Two corresponding rubber frames have superposed sockets at each end. The upper sockets receive the upper or "grip" pouches, and the lower or "follower" pouches are formed by incasing each of the frames, thereby inclosing the grip-pouches. The two frames of a press are connected together at their forward ends. The two grip-pouches are connected by a bell-mouthed tube with the same fluid-supply pipe, and the two follower-pouches are also connected by a similar tube with another supply-pipe.

Second. Supporting the teat-presses. Instead of supporting the teat-presses from a cradle I now carry each press upon an independent arm, which is jointed so as to be capable of movement in all directions. Means are provided for locking said arms when the presses have been adjusted.

Third. Apparatus for suspending the milking-gear and retaining it in position relatively to the animal. A bracket consisting of a body-bow and under arm for supporting the teat-presses and a spring-arm from which said bracket is suspended are still employed; but instead of causing said spring-arm to exert an upward pressure upon the udder I now take all pressure from the udder by interposing a belly-band, which comes into position upon the belly of the animal just in front of the udder. This arrangement also serves to prevent displacement of the gear in case of movement of the animal. The spring-arm is connected to a curved spring carried by a horizontal beam, the forward end of said beam being pivoted, whereby lateral adjustment can be made. Means are provided for readily adjusting the pressure of the spring arrangement.

Fourth. Apparatus for regulating the pressure in the teat-presses and for differentiating between the pressures in the upper or grip and the lower or follower pouches. Two pulsation-bags each operated upon by a rotating cam are placed upon independent air-cushions. Before commencing the milking operation air is pumped into the air-cushions until pressures are produced therein corresponding to the pressures required in the teat-pouches, and when the pressures in the pulsation-bags rise to the desired limit the air-cushions yield and prevent excessive increase of pressure. I connect each air-cushion with an independent metal reservoir.

Fifth. Timing the pulsations in the pouches of the teat-presses. Means are provided for timing the pulsations in the upper and lower pouches relatively to each other by adjusting the space between each pulsation-bag and the lever which operates it. For this purpose I make the lever-arms in two parts and interpose a wedge between them, means being provided for adjusting the wedge and retaining it in position.

Sixth. Throwing the pulsation-gear in and out of action. The air-cushions referred to are carried upon a platform, which is hinged at one end, and means are provided for turning said platform upon said pivot to raise and lower the cushions with the pulsation-bags upon them, whereby they will be operated upon by the cams or otherwise. By this arrangement the cams may be continuously rotated while the pouches are upon the teats of the animal without pulsation being produced in the teat-presses until the moment desired.

The lever-arms, pulsation-bags, air-cushions, reservoirs, and air-pump for inflating the same are all carried upon a tray, which is independent of the cams and driving-gear, so that the pulsation-gear may be carried from stall to stall, an independent cam driving-gear being employed in each stall.

Seventh. Collecting the milk from a series of teat-presses. I use a chute which is adjustably mounted upon a jointed arm, giving freedom of movement in all directions. A swivel-jointed tube connects the chute with a receptacle, and means are provided for straining the milk and preventing splash.

I will now more particularly describe my improvements and the operation of the same by the aid of the accompanying drawings, wherein—

Figure 1 is a side elevation of a teat-press. Fig. 2 is a plan thereof; Fig. 3, a side elevation showing the teat-press open and the pouches drawn through for cleaning purposes. Fig. 4 is a sectional elevation of the outer wall of the teat-press on line A A, Fig. 1. Fig. 5 is a front perspective elevation of a frame of the pulsation-pouches. Fig. 6 is a front elevation of two connected side frames and pouches. Fig. 7 is a side sectional elevation on B B, Fig. 6, a junction-piece and nozzles being added. Fig. 8 is a sectional plan on C C, Fig. 7. Fig. 9 is a similar view on D D, Fig. 7. Fig. 10 is an end sectional elevation on E E, Fig. 7. Fig. 11 is a front elevation of the apparatus which goes under the cow. Fig. 12 is a corresponding side elevation. Fig. 13 is a corresponding plan. Fig. 14 is a side sectional elevation of one of the arms carrying a teat-press; Fig. 15, a plan thereof. Fig. 16 is a side perspective elevation of the pulsation-gear and driving arrangement. Fig. 17 is an end elevation; Fig. 18, a plan of the tray and pulsation-gear. Fig. 19 is a vertical sectional elevation on F F, Fig. 18. Fig. 20 is a side elevation, partly in section, of the milk-catching apparatus. Fig. 21 is a side elevation of a jointed connection. Fig. 22 is a side perspective elevation of the bracket and suspension apparatus. Fig. 23 is an end elevation of the upper end of the body-bow and its bracket, and Fig. 24 a side elevation thereof. Fig. 25 is an end sectional elevation of part of the suspension apparatus. Fig. 26 is a side perspective elevation of a milk-collector, and Fig. 27 a plan thereof.

Referring more particularly to Figs. 1 to 3, the outer wall of the teat-press is made in two parts 1 and 2, the part 1 being secured to the part 2 by pivot-pins 3 and 4 opposite to each other in the opposing walls of the press, said pins passing through guide-slots 5 and 6 in the respective walls of the press, whereby the part 1 may be drawn out longitudinally from the part 2 and turned down into the position indicated in Fig. 3. The end of the part 1 has the hook 7, which receives the pin 8, projecting from the side of the part 2. To drop the part 1 into the position shown in Fig. 3, it is first necessary to raise the end of part 1 until the hook clears the pin 8. Sockets 9 and 10, one above the other upon the front of the part 2, respectively receive the tubes 11 and 12 used for conveying fluid under pulsative pressure to the grip and follower pouches of the press. For strengthening purposes a metal plate 13 is carried across the top of the press at the front and a tie-plate 14 connects the two walls at the bottom of the press, and flutings 15 are provided in the part 1.

Referring now more particularly to Figs. 4 to 10, inclusive, in the construction of the teat pouches and nozzles for conducting fluid thereto I employ two corresponding frames each comprising a side piece 16, having upon its rear end an open ferrule 17 and a closed socket 18, and upon its forward end the ferrule 19, made integral with the ferrule 20, having the projecting spigot 21. The upper or grip pouch 22 is threaded through the ferrules 17 and 19 and its rear end is closed by a cap 23, which is secured within it. The lower or follower pouch 24 is formed by carrying a strip of flexible material around the frame, its side edges being secured to the sockets and ferrules and its ends being secured to the side piece 16. Each spigot 21 has a laterally-projecting boss 25, and the two frames of one set of pouches are connected by cementing together the two bosses, and to insure the bosses coming accurately together they are provided with male and female guides 26 and 27. The two grip-pouches 22 of a press are connected by a U-pipe 28, the ends of which are secured within the open ends of the pouches. The U-pipe has an opening 29, which is covered by a bell-mouthed pipe 30, which communicates with the feed-supply pipe 11. The spigots 21 of the two frames are connected by a bell-mouthed tube 31, which is secured upon them and communicates with the feed-supply pipe 12. The side pieces 16 of the two frames (shown between the dotted lines in Fig. 5) may be dispensed with without impairing the utility of the parts which they connect—viz., the front and rear parts of said frames, consisting of the ferrules and sockets.

The pouches are preferably made of fabric and unvulcanized india-rubber, and during the process of vulcanizing are retained in the position they will normally occupy when collapsed, the result being that they normally tend to lie closely against the sides of the rigid outer walls of the press, and dovetailed lugs 160 on the pouches, engaging in corresponding slots 161 in the part 2 of the teat-press, retain them in this position. When the pouches are withdrawn from the casing to the position shown in Fig. 3 the lugs readily leave the slots.

In order to enable the teat-presses to be adjusted to the positions of the teats of different animals, it is necessary that the means of supporting them should provide for the adjustment of the presses relatively to each other in all directions. For this purpose I connect each press by a ball-and-socket joint to the end of a lever pivotally connected to another lever, the upper end of which is journaled upon an under arm to be described.

Referring now to Figs. 11 to 15 inclusive, the spindle 32 is fixed in the brackets 33 and 34 by bolts 35, which pass through the following parts—viz., the caps 36 of said brackets, the said spindle, the brackets, and the under arm 37, which projects from a body-bow hereinafter described. Upon this fixed spindle 32 are journaled four systems of levers each carrying one of the teat-presses. As these parts are precisely similar it will be sufficient to describe one system. The upper lever 38 has a socket 39 upon its upper end, which is journaled on the spindle 32. A socket 40 upon the lower end of the upper lever receives a spindle 41, which has an integrally-formed jaw 42 projecting at right angles from it. The spindle 41 is held in the socket 40 by a washer 43, fixed upon its end by means of a screw 44. The sockets 39 and 40 are each divided by a saw-cut 45 and have the projecting ears 46 and 47, respectively. The bolt 62 passes through the ears and is sided at its upper end to fit within a recess formed in the ear 46. A wing-nut 63 screws upon the end of the bolt, and by screwing up said nut the ears are drawn toward each other, whereby the sockets 39 and 40 are simultaneously clamped upon the spindles within them. The jaw 42 upon the spindle 41 receives the end of the second lever 50, which is pivoted within said jaw upon a pin 51, a wing-nut 52 upon said pin being employed to lock the joint of the second lever by clamping the two parts of the jaw upon it. The teat-press is swiveled upon the end of the second lever 50 in the following manner: A round spindle 53, having a flat side, fits telescopically within a hole in the end of the lever 50 and is secured therein by the set-pins 54. A ball 55, integral with spindle 53, fits within and bears against the end of a socket 56, which receives a concave washer 57, bearing against the ball under pressure of a spring 58. The opposite end of the spring bears against the head 59 of a bolt 60, which passes through a square hole in a cover 61, said cover fitting tightly within the end of the socket 56 and being secured therein by bending over it the edge of the end of the socket.

The part 2 of the teat-press has a downwardly-projecting ear 58$^a$, through a square hole in which is passed the bolt 60, said bolt having a sided shoulder fitting said hole and also the hole in the cover 61. A washer 61$^a$ is threaded upon the bolt and a nut 61$^b$ screwed up to clamp the ear between the washer and the end of the socket. The upper arm 38 has a projecting ear 64 to guide the bolt 62 and to prevent bending. Brackets 65 and 66, recessed to receive the lower feed-tubes, which convey fluid to the follower-pouches of the teat-presses, are formed integrally one with each of the outer jaws 42. A bridle 67, secured to each of said brackets, surrounds the upper and lower feed-tubes and retains them in position. The ends of the feed-tubes 11 conveying fluid to the grip-pouches are connected to a branch pipe 68, which is connected to a main feed-tube 69, leading to the pulsation-bag for these pouches. The ends of the feed-tubes 12 leading to the follower-pouches are connected by a branch pipe 70 with a main feed-tube 71, leading to the pulsation-bag for the follower-pouches of the teat-presses.

Referring now to Figs. 22 to 25, inclusive, the teat-presses are supported from overhead in the following manner: The under arm 37 projects approximately horizontally from a body-bow 72, which is curved to clear the side of the animal. The bracket 73 at the bottom of the body-bow has a rectangular socket 74, in which the end of the under-arm is removably fitted. Upon the upper end of the body-bow is fixed a bracket 75, having ears 76 journaled upon a bolt 77, carried in ears 78, integral with a socket 79, whereby the body-bow is free to swing longitudinally with the animal. The socket 79 slides and turns upon the cylindrical end of a pole 80, which is of ash or other springy material, and is clamped at its forward end to a curved spring 81. The opposite end of the spring is carried in a fork 82, formed at the end of a lever 83, passing through a beam 86. The opposite end of the lever 83 is adapted to engage in one or other of a number of notches 87, formed in a bracket 88, which is secured to and projects downwardly from the beam 86 and has a foot 89, which limits the upward movement of the pole 80. A handle 90 is made upon the end of the lever 83, and a stop 91, projecting upwardly therefrom, prevents the hand of the operator from being caught between the handle and the beam when adjusting the end of the lever in the notches of the rack referred to. The beam 86 is pivoted at its forward end in a fixed cross-rail 92 and at its rear end has a fixed metal loop 93, which receives another fixed cross-rail 94. By this arrangement the beam can be turned upon its pivot 95 to bring the teat-presses out of the way of a cow entering or leaving the milking-stall and then can be brought back immediately over the spine of the next animal. The socket 79 can be moved along the pole to suit the length of the cow's body and allows the apparatus to swing laterally in case of movement of the animal.

Referring again to Figs. 11, 12, 13, and 22, to prevent displacement of the gear from the animal consequent upon her movements I employ a leather belly-band 96, which is secured at its ends by the lace 97 to wire brackets 98 and 99 and to the intermediate eyes 100 and 101, fixed to the under arm. This belly-band bears against the animal just in front of the udder and is held in position by the upward pressure of the spring arrangement used for supporting the milking and milk-conducting gear. The wire bracket 99 is extended downwardly, forming a guard 102 to protect the jointed arms. Clamps 103 and 104 secure the brackets 98 and 99 with the guard 102 to the under arm 37. A pad 105 is fixed near the middle of the belly-band, where it will occupy a position between the lobes of the udder and help to prevent lateral displacement of the gear and also reduce pressure of the belly-band upon the veins of the animal.

Apparatus for producing intermittent pressure in the teat-pouches is constructed as follows, referring to Figs. 16 to 19, inclusive: The shaft 106 is carried in the bearings 107, fixed to the foundation-frame 108, and carries cams 109 and 110, the fly-wheel 111, and the pulley 112, by which said shaft is revolved from any convenient source of power. The cams 109 and 110 are adapted to engage, respectively, with friction-rollers 113 and 114, which are respectively journaled upon the ends of the levers 115 and 116, said levers being respectively fixed at their ends in brackets 117 and 118, pivoted upon a rod 119, fixed in the brackets 120 and 121, projecting upwardly from a tray 122. Beneath the lever 115 is arranged a cylindrical pulsation-bag 123, communicating through the main feed-tube 69 with the branch pipe 68, which has four branches each, as previously described, having a tube 11 connecting it with the grip-pouches of one teat-press, there being one pulsation-bag for all the upper pouches in a series of presses for milking one animal. Beneath the lever 116 is arranged a similar pulsation-bag 124, communicating through the main feed-tube 71 with the branch pipe 70, having four branches, each having a pipe 12 connecting it with the follower-pouches of one of the teat-presses, there being one pulsation-bag for all the follower-pouches in a series of presses for milking one animal. For the purpose hereinafter described battens 125 and 126 are employed beneath the respective levers 115 and 116. Disk-shaped pressure-blocks 127 and 128 are fixed beneath the respective ends of the battens 125 and 126. The pulsation-bag 123 rests upon an air-cushion 129, which is in communication through a pipe 130 with a metal cylindrical air-reservoir 131, fitted with a pressure-gage 132, and a blow-off cock 133. The pulsation-bag 124 rests upon an air-cushion 134 and is in communication through a pipe 135 with a reservoir 136, similar to reservoir 131 and having a pressure-gage 137 and a blow-off cock 138. An air-pump 139 of ordinary construction is used to force air into both the reservoirs through branch pipes 140 and 141, a two-way cock 142 being employed to open communication between the pump and one or other of the reservoirs, as desired, through non-return valves of well-known construction 143 and 144. The air-cushions have internal vertical tie-walls 145. These are for the purpose of preventing the upward expansion of the cushions beyond a predetermined limit. Without an arrangement of this sort the upward expansion of the air-cushions following the upward movement of the cams would be greater and the cam-stroke would have to be correspondingly longer to permit of the refilling of the pulsation-bags between strokes. The air-cushions could be made sufficiently large to obviate the necessity of employing the reservoirs 131 and 136; but I think it better to employ them. The levers 115 and 116 are returned after the downstroke of the cam by coil-compression springs 146 and 147, which are interposed between the under sides of the levers and the bottom of the tray 122. Thongs 148 and 149 of leather or the like connect the levers with the bottom of the tray 122 and prevent the levers from rising more than is required.

To insure effective milking, it is necessary that the upper or grip pouches of a teat-press squeeze the upper part of the teat in advance of the lower or follower pouches, which are used to squeeze out the milk from the teat. To obtain this result, I employ the battens 125 and 126, one beneath each of the levers 115 and 116, as hereinbefore indicated, and interpose the wedge 150 between the lever 115 and batten 125 and the wedge 151 between the lever 116 and the batten 126. The battens are respectively pivoted at their rear ends upon the pins 152 and 153 in the brackets 117 and 118. The adjustment of one of the wedges between its lever and batten brings the pressure-block 127 or 128, carried by the batten, closer to or farther away from its cam, with the result that the pressure-block comes into action upon the pulsation-bag sooner or later, as the case may be. Each wedge has a rearwardly-extending rod 154, having an upward extension provided with a looped handle 155. This looped handle engages in one or other of the notches of a notched bracket 156, secured upon the top of the lever to hold the wedge after adjustment. Plates 162, secured to the battens, form channels to guide the wedges. If the pulsation-pouches are charged in the proper relative proportions in the first instance, no adjustment of the wedges is necessary; but they are useful when the charging of the pouches is not done with accuracy. The handle 157 is secured to the tray for convenience in carrying it about.

In practice it is advisable to run the cam-shaft continually and to commence the milking operation very gradually. To effect this, the pulsation-bags and their levers are lowered until they are out of reach of the throw of the cams in the following manner: The tray 122 rests upon the platform 158, which is hinged at its rear end to the foundation-frame 108. The flat bar 159 extends across the foundation-frame and is eccentrically journaled at its ends therein in such manner that when the said bar is rocked the front end of the platform is raised, raising with it the front end of the tray. Pipes 179 and 180 upon the respective pulsation-bags 123 and 124 have taps 181 and 182, to which flexible tubing may be connected, having funnels at their upper ends for the purpose of supplying liquid to the pulsation-bags from some height above them, so that air does not pass into the bags with the liquid.

Referring now more particularly to Figs. 20, 21, 26, and 27, the milk is collected from the four teat-presses comprising a milking set in a vessel 163, having a rectangular socket 164 fitting over a slide-piece 165, pivoted to move in a vertical longitudinal plane upon the jointing-piece 166. The jointing-piece is pivoted to move in a horizontal plane upon the arm 167, the opposite end of which is also horizontally pivoted to a jointing-piece 168, which is pivoted to move in a vertical longitudinal plane upon the end of the arm 169, which is journaled in a bracket 170, fixed to the under arm 37. This arrangement permits of the vessel 163 being moved vertically and horizontally to suit different animals. The vessel is removed by sliding the socket 164 off the slide-piece 165. The bottom of the vessel 163 inclines toward a discharge-tube 171, the end 172 of which is spherical and fits freely within the upper end of a tapering tube 173, having hinged upon it a wire loop 174, which takes over a hook 175 upon the end of tube 171.

To prevent splash of the milk falling into the vessel 163, I employ an apron 176 of fabric, such as flannellet, which fits over the top edges of the walls of the vessel. An upwardly-projecting wire frame 177 is fixed upon the bottom of the vessel and raises the middle of the fabric, and a wire bow 178, serving as a weight, rests upon the fabric upon each side of the frame and causes it to hang in a series of inclined planes, against which the milk impinges.

Having now particularly described and ascertained the nature of my said invention and in what manner the same is to be performed, I declare that what I claim is—

1. In combination an outer wall in two parts, pivot-pins projecting laterally from the one part engaging in holes in the other part, and means for retaining the two parts relatively to each other when they are in the positions they occupy when the apparatus is at work, substantially as specified and illustrated.

2. The combination in a teat-press of an outer wall in two parts, a rear part adapted to slide upon a front part, pins projecting from the front part engaging in guide-holes in the rear part and a hook upon the rear part adapted to take over a pin projecting laterally from the front part substantially as specified and illustrated.

3. In a teat-press in combination a rigid outer wall, flexible pouches within said outer wall, a groove in each side of said outer wall and a projecting tongue upon each of said flexible pouches adapted to be received by said grooves.

4. In the construction of a teat-press a part frame comprising a side piece, a ferrule and a socket upon the rear and superposed ferrules upon the forward end thereof and an integrally-formed spigot projecting from the lower of said ferrules.

5. In the construction of a teat-press, a rear-part frame comprising a closed socket and a superposed integrally-formed ferrule.

6. In the construction of a teat-press a forward-part frame comprising two superposed integrally-formed sockets, the lower of said sockets having a projecting spigot.

7. In the construction of a teat-press in combination, two forward-part frames, each comprising two integrally-formed superposed sockets each of the lower sockets having a projecting spigot, tubes one threaded through the uppermost of each of said sockets; a U-pipe connecting said tubes, a bell-mouthed tube receiving said U-pipe and a bell-mouthed pipe connecting said spigots.

8. In the construction of a teat-press in combination, two frames, an open ferrule and a closed socket superposed and integrally formed upon the rear end of each frame, two tubes one threaded through the two upper ferrules of each frame, each tube forming an upper pouch, a closure for the rear ends of said tubes, a U-pipe connecting said tubes and a bell-mouthed tube secured over said U-pipe, a casing for each frame each forming an outer pouch, spigots one projecting from the lower ferrule at the forward end of each frame, a boss projecting laterally from each spigot, and bell-mouthed tube secured over and connecting said spigots.

9. In apparatus for the purpose indicated an adjustable carrier for a teat-press comprising in combination, an upper lever, a support upon which said upper lever is pivoted, a second lever connected by a double joint to the end of the upper lever, a swivel-joint upon the end of the second lever and a teat-press connected thereto.

10. For the purpose indicated in combination, the under arm, means for supporting the same relatively to a cow, an upper lever journaled upon said arm, a second lever connected by a double joint to the end of the first lever and a swivel-joint upon the end of said second lever by which a teat-press is connected thereto.

11. In combination means for adjustably supporting teat-presses comprising in combination the under arm, with means for supporting the same relatively to a cow, a spindle fixed longitudinally upon said under arm, an upper lever journaled thereon, a socket at the lower end of said lever, a spindle received by said socket, a jaw upon said spindle, a second lever pivoted in said jaw, a ball upon the end of said second lever, a socket receiving said ball, and means for securing said socket to the teat-press, substantially as specified.

12. For the purpose indicated the under arm and the jointed levers for carrying a teat-press comprising an under arm, means for supporting the same relatively to a cow, a lever carried upon said arm having sockets one at each end, the socket at the upper end journaled upon a spindle fixed to the under arm and the socket at the lower end receiving a spindle pivotally connected to another lever, said sockets being divided and having projecting ears, a bolt passing through said ears, and a nut upon the bolt whereby said sockets may be simultaneously clamped upon said spindles.

13. Means for supporting a vessel receiving milk from a series of teat-presses, comprising in combination, the under arm, means for supporting the same relatively to a cow, a lever journaled upon said arm, a second lever connected by a double joint to the end of the first lever, a slide-bracket connected by a double joint to the end of said second lever, a receiving vessel and a socket fixed thereon receiving said slide-bracket.

14. In a milking-machine apparatus for receiving milk from a series of teat-presses and conveying it to a receptacle comprising in combination, a receiving vessel, a discharge-pipe thereon, a ball at the end of said pipe, a conveyer-tube and a socket at one end thereof receiving said ball, substantially as specified.

15. Apparatus for receiving straining and delivering milk from a series of teat-presses comprising in combination, a receiving vessel, a discharge-pipe thereon, a wire frame projecting upwardly from the bottom of the vessel, an apron of fabric supported by said frame and the top edges of the walls of the vessel, and a weight designed to rest upon the fabric, substantially as specified.

16. Means for adjustably supporting milking apparatus from above an animal comprising in combination a curved body-bow, the under arm removably connected to its lower end and adapted to support a series of teat-presses, a socket means for pivotally connecting the upper end of the body-bow to said socket and a spring-pole upon which the socket is slidably mounted with means for supporting said pole from one end.

17. In apparatus for supporting milking apparatus from above an animal in combination, a curved body-bow, an under arm upon its lower end adapted to support a series of teat-presses, a pole to which the upper end of the body-bow is connected, a bow-spring to which the end of the pole is secured, a lever connected to the bow-spring, a fulcrum for the lever, a bracket having a plurality of notches adapted to be engaged by said lever and a support for the fulcrum and said bracket.

18. In combination a curved body-bow, an under arm upon its lower end adapted to support a series of teat-presses, a belly-band upon said arm, a socket, means for pivotally connecting the upper end of the body-bow to said socket, a pole upon which said socket is slidably mounted, a bow-spring to which the end of the pole is secured, a lever connected to the bow-spring, a fulcrum for the lever, a bracket having a plurality of notches adapted to be engaged by said lever and a support for the fulcrum and said bracket.

19. Apparatus for supporting milking apparatus from above an animal comprising in combination a curved body-bow, an under arm upon its lower end adapted to support a series of teat-presses, a socket, means for pivotally connecting the upper end of the body-bow to said socket, a pole upon which said socket is slidably mounted, a bow-spring to which the end of the pole is secured, a lever connected to the bow-spring, a fulcrum for the lever, a bracket having a plurality of notches adapted to be engaged by said lever, and a support for the fulcrum and said bracket.

20. In combination a curved body-bow, the under arm connected thereto, a belly-band upon said arm, a pole from which the body-bow is pivotally suspended, a spring connected to the end of the pole and a support for said spring.

21. For supporting milking apparatus in combination the curved body-bow, the under arm connected thereto, a pole from which the body-bow is suspended, a spring connected to the end of the pole and a horizontally-pivoted beam supporting said spring.

22. The apparatus for employment in connection with means for producing pulsation in teat-presses, for regulating the pressure in said presses, comprising in combination, a revolubly-mounted shaft a cam fixed thereon, a pivoted lever beneath the cam, a pulsation-bag beneath the lever, an air-cushion supporting the pulsation-bag, a reservoir, a tube connecting the reservoir with said air-cushion, a pump for compressing air in the air-cushion, a spring for returning the lever after a downstroke of the cam and means for connecting the pulsation-bag with the pouches of a teat-press.

23. The apparatus for employment in connection with means for producing pulsation in teat-presses, for regulating the pressure in said presses, comprising in combination, a revolubly-mounted shaft, a cam fixed thereon, a pivoted lever beneath the cam, a pulsation-bag beneath the lever, an air-cushion supporting the pulsation-bag, a pump for compressing air in the air-cushion, a spring for returning the lever after a downstroke of the cam and means for connecting the pulsation-bag with the pouches of a teat-press.

24. Apparatus for regulating the time of coming into action of the cams operating the pulsation-bags comprising in combination a revolubly-mounted shaft, a cam fixed thereon, a lever pivoted at one end, a batten pivoted at one end, a pressure-block upon the batten, a wedge between the lever and the batten, a rod connected to said wedge, a handle upon said rod and a bracket having a plurality of notches adapted to be engaged by said handle.

25. The apparatus for producing pulsation in the teat-presses and throwing same into and out of action comprising in combination a revolubly-mounted shaft, a cam fixed thereon, a lever operable by said cam, a pulsation-bag beneath the lever, a tray carrying the pulsation-bag, a foundation-frame, a bar journaled eccentrically therein adapted to raise one end of said tray and a lever for rocking said bar, substantially as specified.

In testimony whereof I have signed my name to this specification in the presence of two witnesses.

GEORGE HUTCHINSON.

Witnesses:
E. S. BALDWIN,
J. J. WATSON.